United States Patent [19]

Saito

[11] 4,231,555

[45] Nov. 4, 1980

[54] BAR-SHAPED TORSION SPRING

[75] Inventor: Tsutomu Saito, Matsudo, Japan

[73] Assignee: Horikiri Spring Manufacturing Co., Ltd., Yachiyo, Japan

[21] Appl. No.: 4,579

[22] Filed: Jan. 18, 1979

[30] Foreign Application Priority Data

Jun. 12, 1978 [JP] Japan .............................. 53/80213[U]
Aug. 18, 1978 [JP] Japan ........................... 53/113364[U]

[51] Int. Cl.³ .............................................. F16F 1/14
[52] U.S. Cl. .................................................... 267/154
[58] Field of Search ............ 188/130; 267/57, 57.1 A, 267/154

[56] References Cited

U.S. PATENT DOCUMENTS 2,867,841  1/1959  Baldauf ............................. 267/154 X
3,540,714  11/1970  Mueller ................................ 267/154

FOREIGN PATENT DOCUMENTS 1430369  1/1966  France ...................................... 267/154

Primary Examiner—Duane A. Reger
Attorney, Agent, or Firm—Fleit & Jacobson

[57] ABSTRACT

A bar-shaped torsion spring, such as a torsion bar or a stabilizer. The spring is made with a hollow interior main body. Linking mechanisms and fixing portions are formed integral with or connected to both ends of the main body of the spring. A cover of reinforced plastics is applied to the outer circumference of the main body of the spring.

7 Claims, 10 Drawing Figures

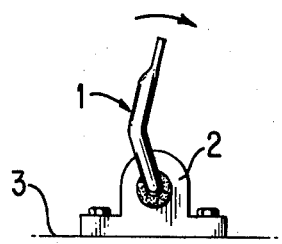
FIG. 1
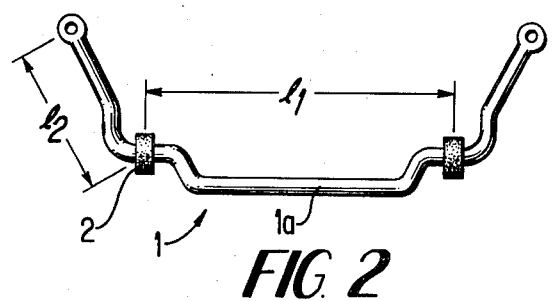
FIG. 2
FIG. 3
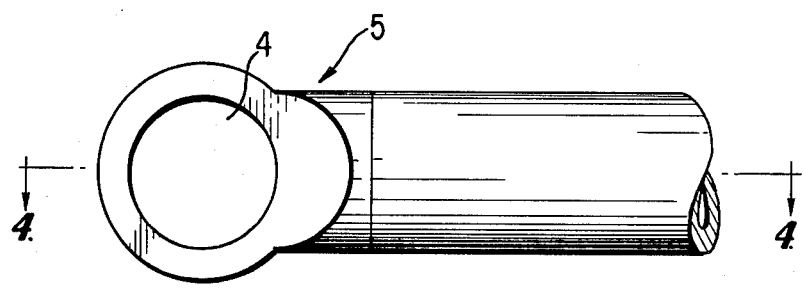
FIG. 4
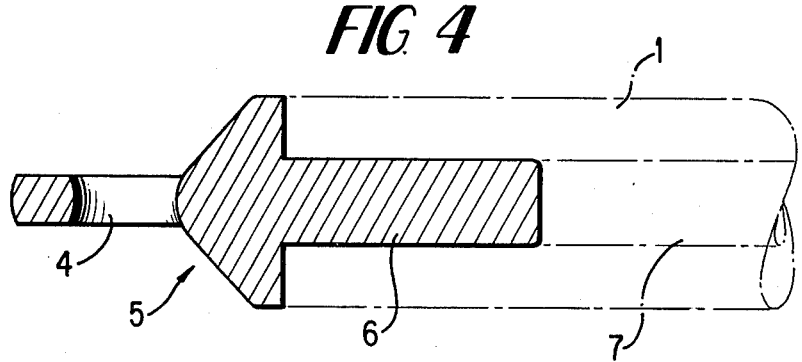

BAR-SHAPED TORSION SPRING

BACKGROUND OF THE INVENTION

FIELD OF THE INVENTION

This invention relates to the structure of a bar-shaped torsion spring, such as a torsion bar or a stabilizer.

According to previously known methods, a bar-shaped torsion spring of this sort is formed as a whole, solid body. The linking portions at its both ends, for instance in the case of a stabilizer, are pressed down to be made into flat shape, and, thereafter, linking holes are pierced therein. Otherwise, with a torsion bar, the linking portions are merely made into hexagonal shape. Therefore, the weight tends to be too heavy. Furthermore, since the bar-shaped torsion spring is a relatively long body, handling is not easy for the processing or fixing of linking portions to both ends. Further, various problematical points exist in regards to its performance. In order to make the spring lighter in weight, it has been proposed to make such a spring into pipe shape. However, it has been feared that, in this instance, the strength of the linking portions at both ends has not been sufficient, in some cases, to avoid breakage or damage.

SUMMARY OF THE INVENTION

In view of the defects mentioned above, the present invention is intended to furnish a bar-shaped torsion spring, such as a torsion bar or a stabilizer, which is simple in construction and has high rigidity, the linking portions of which are constituted as separate members that can be selected based on the shape and strength required by a particular installation. A first feature of the present invention is that a leg portion of each linking portion or means is inserted and fixed in a hollow portion at each end of the main body of a bar-shaped torsion spring. A second feature is that outside the hollow portion, at each end of the main body of a bar-shaped torsion spring, is formed a fixing portion having a periphery larger than the outer periphery of said hollow portion. The connection of the hollow portion and the fixing portion is formed as one unit having thicker, preferably metallic, walls. A third feature is that, in certain installations, a reinforced plastic cover is put on the outer circumference of the main body of the bar-shaped torsion spring, except for the linking means and the fixing portions. The plastic cover makes the spring lighter in weight and improves the rigidity and strength of the spring.

The invention, and its features and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1 is a side view of a bar-shaped torsion spring according to the present invention in an installed position.

FIG. 2 is a front elevational view of FIG. 1.

FIG. 3 is an enlarged view of one end of the embodiment of FIG. 2.

FIG. 4 is an enlarged cross section along line 4—4 of FIG. 3.

DESCRIPTION OF THE PREFERRED EMBODIMENTS

Figure 5:
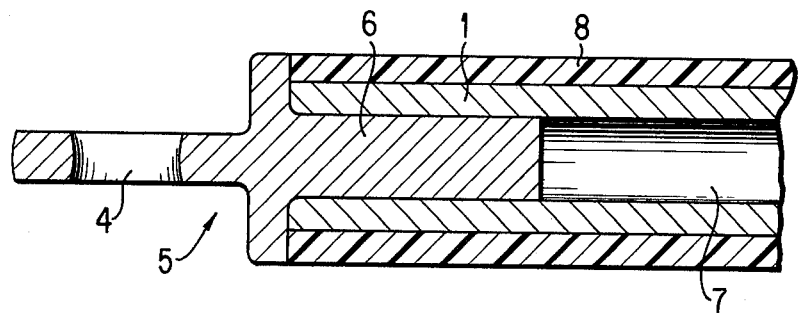
FIG. 5 is a cross section, similar to FIG. 4, showing another embodiment.

Because torsion springs are well known, the present description will be directed in particular to elements forming part of, or cooperating more directly with, the present invention. Elements not specifically shown or described herein are understood to be selectable from those known in the art.

I will explain this invention concretely on the basis of the attached drawings illustrating various embodiments.

FIG. 1 through FIG. 5 illustrate embodiments of bar-shaped torsion springs, for instance, stabilizers. The numeral 1 denotes a bar-shaped torsion spring having a hollow interior main body 1a. As shown in FIG. 1, the main body is attached to a firm object 3, such as the body of a vehicle, etc. by means of supporting metallic fixtures 2.

An elongate portion 1a of the main body of the bar-shaped torsion spring, having a length $l_1$, is supported at its ends by supporting metallic fixtures 2, only a portion of which are shown in FIG. 2. This portion of spring 1 provides a torsion spring function. A bending function is provided over the lengths $l_2$, which extend from the respective supporting metallic fixtures 2 to the respective ends of the bar-shaped torsion spring 1.

As is shown in FIG. 3 and FIG. 4, at each end of the main body of a bar-shaped torsion spring, linking means 5 having linking holes 4 are provided. A leg portion 6 of each of the linking means 5 is inserted and fixed in the hollow portion of the main body of the bar-shaped torsion spring. For the insertion and fixation of the leg portion 6, any fixing methods hitherto known, such as screwing, welding or pressing, can be used. The sizes, shapes, material quality, etc., of said linking means 5 and linking hole 4 can be selected according to the requirements of their use.

As is shown in FIG. 5, one embodiment of the present invention has an outer circumferential surface of a hollow bar-shaped torsion spring molded or covered with a cover 8 of reinforced plastics, such as fiber reinforced plastics (FRP). Preferably, linking means 5 is not covered. In this instance, not only is rust prevention ensured by applying a cover 8 of reinforced plastics, but also improved fatigue strength is obtained. Moreover, even if the metallic thickness of a bar-shaped torsion spring having a hollow pipe-like interior is made thinner to attain further lightening of the weight, desired rigidity and strength can still be achieved.

Figure 6:
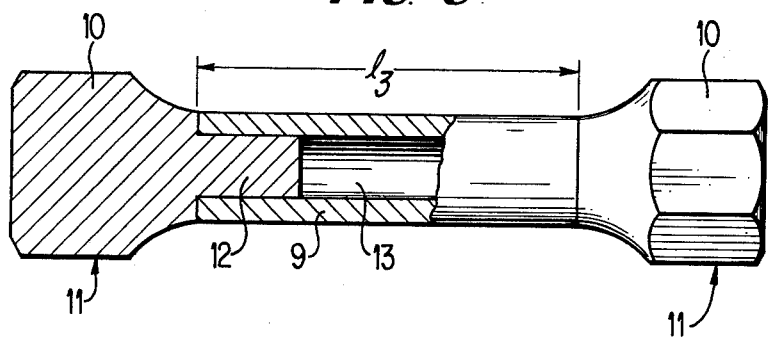
FIGS. 6 and 7 are partially broken away side views showing other embodiments.
Figure 7:
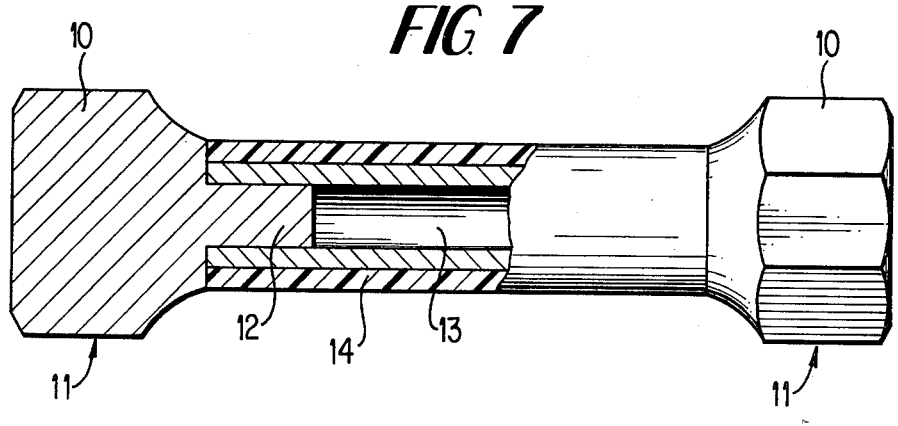

FIG. 6 and FIG. 7 show embodiments of bar-shaped torsion springs, such as torsion bars. A linking means 11, possessing a hexagonal linking portion 10, is inserted and fixed at each end of a main body 9 of a hollow bar-shaped torsion spring by inserting a leg portion 12 of the linking means into a hollow portion 13 of the spring. Thus, this bar-shaped torsion spring exercises its torsion spring function in the interval of the length $l_3$.

FIG. 7 shows an embodiment in which the circumferential surface of the hollow pipe is molded with a plastic cover 14. In this instance, the same functional effect as aforementioned can be expected.

As explained above in detail, since the main body of the bar-shaped torsion spring receiving torsion and bending stress has been formed to be hollow and the leg portions of the linking means have been inserted and fixed in the hollow portion at both ends of the main body of the bar-shaped torsion spring, the past defects have been eliminated. Thus, the apparatus or spring of the present invention is lighter in weight, better in rigidity, and endowed with improved operational performance. Further, production costs are lowered.

Figure 8:
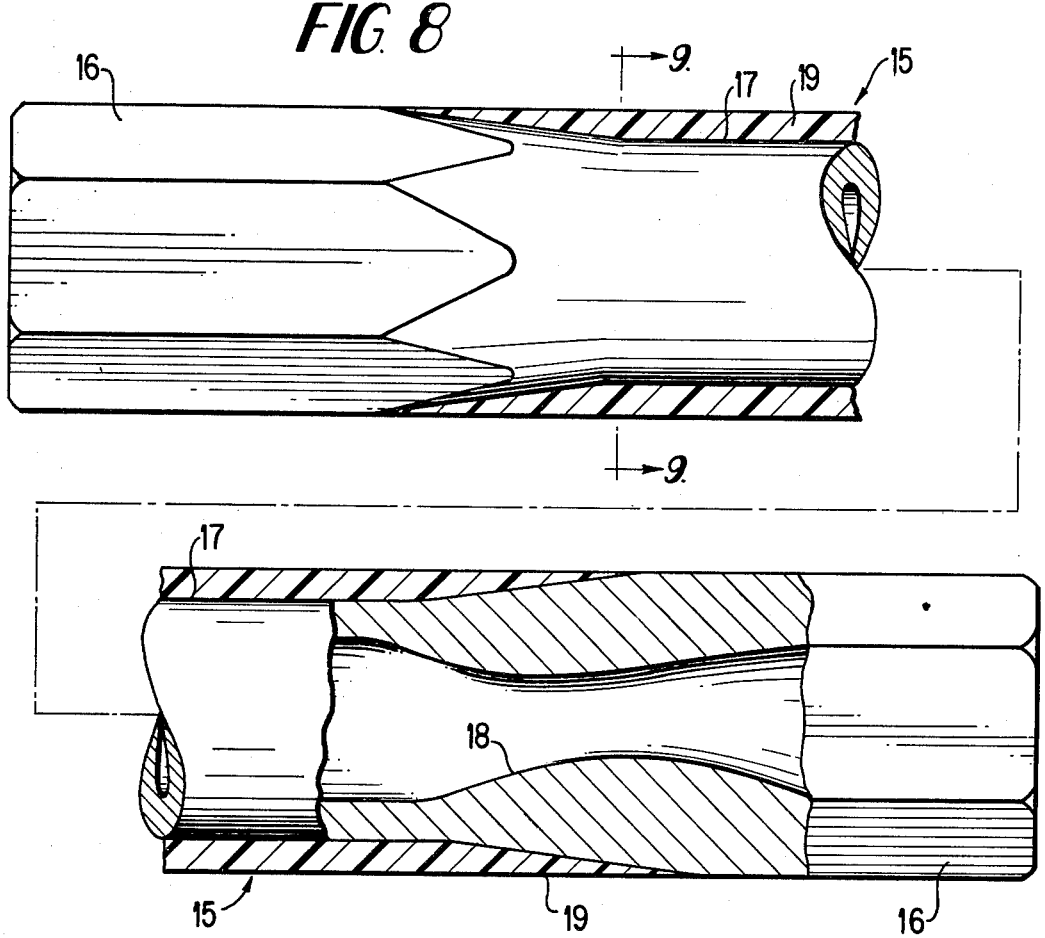
FIG. 8 is a partially broken away plan view showing another embodiment.
Figure 9:
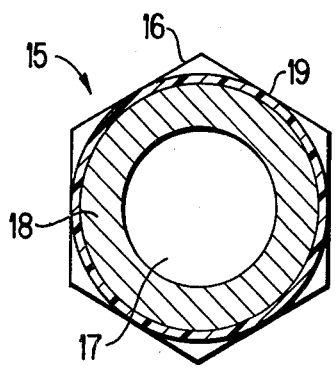
FIG. 9 is a cross section along line 9—9 of FIG. 8.

Referring now to FIG. 8, a partially broken away plan view of another embodiment of a hollow torsion bar according to the present invention is shown. With this embodiment, the outer peripheries of both ends of a hollow torsion bar are so constituted that a fixing portion, for instance of hexagonal shape, is formed to be larger than the outer periphery of the hollow pipe 17. Said hollow pipe 17 and fixing portion 16 connect with each other smoothly and continuously. This connecting portion is the portion where the stress of the torsion bar is concentrated and is formed into a thick metallic portion 18, in order to enhance rigidity and fatigue strength.

Figure 10:
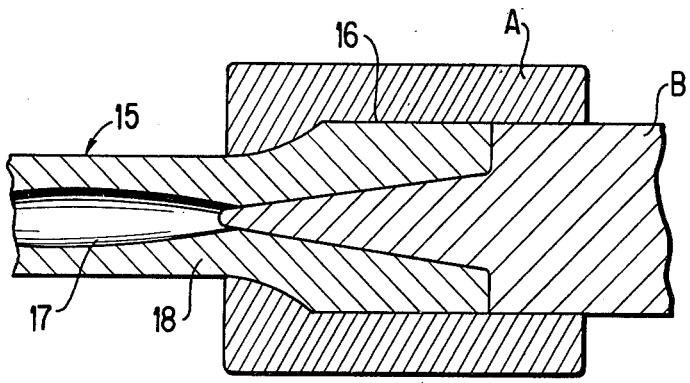
FIG. 10 is a cross section of one component of the embodiment of FIGS. 8 and 9 illustrating a forming method, according to the present invention, for the component.

Said thick metallic portion 18 can easily be formed by means of such a method as the upsetter processing, as is shown in FIG. 10. That is, the end of a hollow pipe 17 is formed simultaneously as a whole by means of prescribed molds or casts A and B. The hexagonal fixing means 16 at the periphery of the respective end and the thick metallic portion 18 subject to concentrated stress are continuously and simultaneously formed as a whole. As is mentioned with previous embodiments it may be desirable to mold or cover the outer circumferential surface of the hollow pipe of the torsion bar 15 with a cover of reinforced plastics 19, except for the fixing portions 16 at both ends. In this instance, the thickness of said plastic cover 19 is so made that the cover touches the fixing portions 16 a both ends or is situated between the tapered ends of adjacent surfaces, as shown in the left-hand portion of FIG. 8.

A pipe-like hollow torsion bar can easily be formed by means of a cold drawing machine, and the fixing portion to be attached with a vehicle, etc., is made simultaneously with the formation of the thicker metallic wall at the stress concentrated portion of the hollow torsion bar. This enables the remainder of the bar-shaped torsion spring to be elongated.

Moreover, by simultaneously molding or covering with a cover of synthetic material, such as reinforced plastics, not only is rust prevention ensured but also fatigue strength is enhanced, so that such good effects as the attainment of required rigidity and strength can be obtained.

What is claimed is:

1. A bar-shaped torsion spring, such as a torsion bar or a stabilizer, comprising an elongate main body having a hollow interior, fixing portions associated with both ends of the main body, and connection portions integral with and interconnecting said fixing portions to ends of said hollow body so that said fixing portions are connected smoothly and continuously to peripheral portions of said ends of said hollow main body, said connecting portions having thicker walls than walls of said ends and said fixing portions, outer peripheries of said fixing portions being greater than outer peripheries of said ends of said hollow main body.

2. A bar-shaped torsion spring according to claim 1, wherein said fixing portions have portions adapted for connection to an object to be supported, and leg portions inserted into and fixed to the interior of said hollow main body so that said fixing portions are connected to said main body.

3. A bar-shaped torsion spring according to claim 1 or 2, further comprising a cover of reinforced plastics positioned on the outer periphery of said hollow main body.

4. A bar-shaped torsion spring, such as a torsion bar, comprising an elongate main body having a hollow interior and a linking means for linking the main body to a body to be sprung, said linking means having a column-shaped leg portions and a linking head portion, said linking means being separately formed from said main body and said column-shaped leg portion being inserted into the hollow interior of each end of said main body and fixed integrally with said main body.

5. A bar-shaped torsion spring according to claim 4, wherein said linking head portion has a square shape.

6. A bar-shaped torsion spring according to claim 4, wherein said linking head portion has a linking hole extending therethrough.

7. A bar-shaped torsion spring according to one of claims 4, 5, or 6, further comprising a cover of reinforced plastics positioned on the outer periphery of said hollow main body.

* * * * *